(12) United States Patent
Chengalvala et al.

(10) Patent No.: US 11,016,712 B2
(45) Date of Patent: May 25, 2021

(54) SYSTEMS AND METHODS FOR GENERATING A CUSTOMIZED DISPLAY IN A VEHICLE

(71) Applicant: Ford Global Technologies, LLC, Dearborn, MI (US)

(72) Inventors: Venkata Maruthe Ravikumara Sharma Chengalvala, Troy, MI (US); James Wilhelm Heaton, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/534,954

(22) Filed: Aug. 7, 2019

(65) Prior Publication Data

US 2021/0042076 A1 Feb. 11, 2021

(51) Int. Cl.
*G06F 3/14* (2006.01)
*G01C 21/36* (2006.01)

(52) U.S. Cl.
CPC ........... *G06F 3/14* (2013.01); *G01C 21/3682* (2013.01)

(58) Field of Classification Search
None
See application file for complete search history.

(56) References Cited

U.S. PATENT DOCUMENTS

| 4,129,001 A | * | 12/1978 | Keyzer | B60R 16/0235 |
| | | | | 123/549 |
| 9,283,954 B2 | | 3/2016 | Dalum | |
| 2007/0018846 A1 | * | 1/2007 | Taraian | G08C 17/02 |
| | | | | 340/3.9 |
| 2009/0157289 A1 | * | 6/2009 | Graessley | B60L 3/12 |
| | | | | 701/123 |

(Continued)

FOREIGN PATENT DOCUMENTS

EP 2237985 B1 11/2012

OTHER PUBLICATIONS

Larsen, A., et al. "Partially Dynamic Vehicle Routing-Models and Algorithms." The Journal of the Operational Research Society, vol. 53, No. 6, 2002, pp. 637-646. JSTOR, www.jstor.org/stable/823007.

(Continued)

*Primary Examiner* — Jwalant Amin
(74) *Attorney, Agent, or Firm* — Brandon Hicks; Eversheds Sutherland (US) LLP

(57) ABSTRACT

This disclosure is generally directed to systems and methods for generating a customized display in a vehicle. The customized display may be generated on the basis of various factors such as a reason for executing a trip, a preferred travel model, and/or operating parameters of the vehicle. A few exemplary reasons for executing a trip can include taking a vacation, delivering a package, dropping off a passenger, dining out, going to work, a fuel fill up, and/or for charging a battery. A computer may utilize such reasons to identify objects of interest in a geographical area surround- (Continued)

ing the vehicle when the vehicle is executing the trip and generate a customized display that includes these objects. For example, when the reason for executing the trip is a vacation, the objects in the customized display may include a tourist attraction, a landmark, a fueling station, an electric charging station, and/or a restaurant.

20 Claims, 11 Drawing Sheets

(56) References Cited

U.S. PATENT DOCUMENTS

| | | | |
|---|---|---|---|
| 2011/0166774 A1* | 7/2011 | Schunder | G01C 21/3469 701/533 |
| 2012/0011167 A1 | 1/2012 | Schmidt | |
| 2012/0216767 A1* | 8/2012 | Ulrey | B60H 1/14 123/142.5 R |
| 2014/0352283 A1* | 12/2014 | Kumagai | F01N 3/2013 60/286 |
| 2017/0213137 A1* | 7/2017 | Geller | G01C 21/3484 |
| 2017/0282744 A1* | 10/2017 | Koo | B60W 20/13 |
| 2018/0209800 A1* | 7/2018 | Saito | G01C 21/3679 |
| 2018/0257666 A1* | 9/2018 | Bryan | B60K 6/48 |
| 2018/0356245 A1* | 12/2018 | Schein | G01C 21/3461 |
| 2018/0357438 A1 | 12/2018 | Gayton et al. | |
| 2019/0011273 A1* | 1/2019 | Powell | G01C 21/3469 |
| 2019/0164421 A1* | 5/2019 | Lauer | B60H 1/00742 |
| 2019/0250616 A1* | 8/2019 | Ramanujam | G05D 1/0088 |
| 2019/0283531 A1* | 9/2019 | Spryshak | B60H 1/00742 |
| 2019/0361463 A1* | 11/2019 | Nelson | G06F 16/9537 |

OTHER PUBLICATIONS

Othman, M. et al. "Efficient journey planning and congestion prediction through deep learning," 2017 International Smart Cities Conference (ISC2), Wuxi, 2017, pp. 1-6. doi: 10.1109/ISC2.2017.8090805.

\* cited by examiner

Multi Segment - Goods

| 605 Terminal Location | 620 Geography | 630 Heating/Cooling Requirements | | | 655 Type of Goods | 665 Fuel Optimization Travel Model |
|---|---|---|---|---|---|---|
| 710 Pickup Locations | 625 Traffic Density | 635 Gas Station Information | 640 Charging Station Information | 645 Current Fuel Level | 660 Current Charge Level | 670 Charge Optimization Travel Model |
| 711 Dropoff Locations | | | | 650 Weather Information | | 675 Pre-Condition Optimization Travel Model |
| 715 Trip Time | | | | | | |

Single Segment - People

| 605 Terminal Location | 620 Geography | 630 Heating/Cooling Requirements | | Vehicle 805 Occupancy Information | 810 Driving Habits | 665 Fuel Optimization Travel Model |
|---|---|---|---|---|---|---|
| 610 Pickup Location | 625 Traffic Density | 635 Gas Station Information | 640 Charging Station Information | 645 Current Fuel Level | 660 Current Charge Level | 670 Charge Optimization TravelModel |
| 611 Dropoff Location | | | | | | |
| 615 Trip Time | | | | 650 Weather Information | | 675 Pre-Condition Optimization Travel Model |

Multi Segment - People

505 ↙

| | 620 Geography | 630 Heating/Cooling Requirements | | Vehicle 805 Occupancy Information | 810 Driving Habits | 665 Fuel Optimization Travel Model |
|---|---|---|---|---|---|---|
| 905 Pickup Locations | 625 Traffic Density | 635 Gas Station Information | 640 Charging Station Information | 645 Current Fuel Level | 660 Current Charge Level | 670 Charge Optimization Travel Model |
| 910 Dropoff Locations | | | | | | |
| 915 Wave Locations | 920 Trip Times | | | 650 Weather Information | | 675 Pre-Condition Optimization Travel Model |

FIG. 9

Single Segment – People & Goods

505

| 605<br>Terminal Location | 620<br>Geography | 630<br>Heating/Cooling Requirements | 655<br>Type of Goods | 615<br>Trip Times | 665<br>Fuel Optimization Travel Model |
|---|---|---|---|---|---|
| 610<br>Pickup Location | 625<br>Traffic Density | 635<br>Gas Station Information | 645<br>Current Fuel Level | 660<br>Current Charge Level | 670<br>Charge Optimization Travel Model |
| 611<br>Dropoff Location | 11<br>Range Information | 640<br>Charging Station Information | 650<br>Weather Information | | |
| | 12<br>Direction of Travel | 13<br>Boundary Information | 805<br>Vehicle Occupancy Information | 14<br>Historic Geofence | 675<br>Pre-Condition Optimization Travel Model |

FIG. 10

Multi Segment – People & Goods

| 605<br>Terminal Location | 620<br>Geography | 630<br>Heating/Cooling Requirements | 655<br>Type of Goods | 620<br>Trip times | 665<br>Fuel Optimization Travel Model |
|---|---|---|---|---|---|
| 610<br>Pickup Locations | 625<br>Traffic Density | 635<br>Gas Station Information | 645<br>Current Fuel Level | 620<br>Current Charge Level | 670<br>Charge Optimization Travel Model |
| 610<br>Dropoff Location | 11<br>Range Information | 640<br>Charging Station Information | 650<br>Weather Information | | |
| 915<br>Wave Locations | 12<br>Direction of Travel | 13<br>Boundary Information | 805<br>Customer Information | 805<br>Vehicle Occupancy Information | 675<br>Pre-Condition Optimization Travel Model |

SYSTEMS AND METHODS FOR GENERATING A CUSTOMIZED DISPLAY IN A VEHICLE

FIELD OF THE DISCLOSURE

This disclosure generally relates to vehicles, and more particularly relates to a customized display in a vehicle.

BACKGROUND

Vehicle manufacturers are constantly striving to offer more features and amenities in their vehicles so as to attract new buyers by providing an enhanced driving experience. For example, many vehicles now include gadgets such as a navigation system that is integrated into the vehicle, a hands-free communication system that enables a driver to participate in telephone calls without taking his/her hands off the steering wheel, a climate control system that automatically sets a desired temperature in the cabin of the vehicle, and a collision avoidance system that senses and helps in avoiding collisions.

Most of these devices are typically designed to cater to a diverse set of customers and as such, the features offered in the devices may satisfy some customers while leaving some other customers less than satisfied. For example, a navigation system may include a display screen that allows a driver to select from a fixed menu of options. The fixed menu of options may not necessarily satisfy individual preferences or needs of the driver. As another example, an infotainment system provided in a vehicle may provide information that is generic to a broad range of customers but may not necessarily satisfy individual preferences or needs of a driver. It is therefore desirable to provide systems and methods that allow customizing a device provided in a vehicle (such as a navigation system or an infotainment system) in accordance with various individual preferences.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 7 shows a second tabular representation indicating exemplary parameters that may be used for generating a customized display in a vehicle in accordance with the disclosure.

FIG. 8 shows a third tabular representation indicating exemplary parameters that may be used for generating a customized display in a vehicle in accordance with the disclosure.

FIG. 9 shows a fourth tabular representation indicating exemplary parameters that may be used for generating a customized display in a vehicle in accordance with the disclosure.

FIG. 10 shows a fifth tabular representation indicating exemplary parameters that may be used for generating a customized display in a vehicle in accordance with the disclosure.

FIG. 11 shows a sixth tabular representation indicating exemplary parameters that may be used for generating a customized display in a vehicle in accordance with the disclosure.

DETAILED DESCRIPTION

Overview

Figure 1:
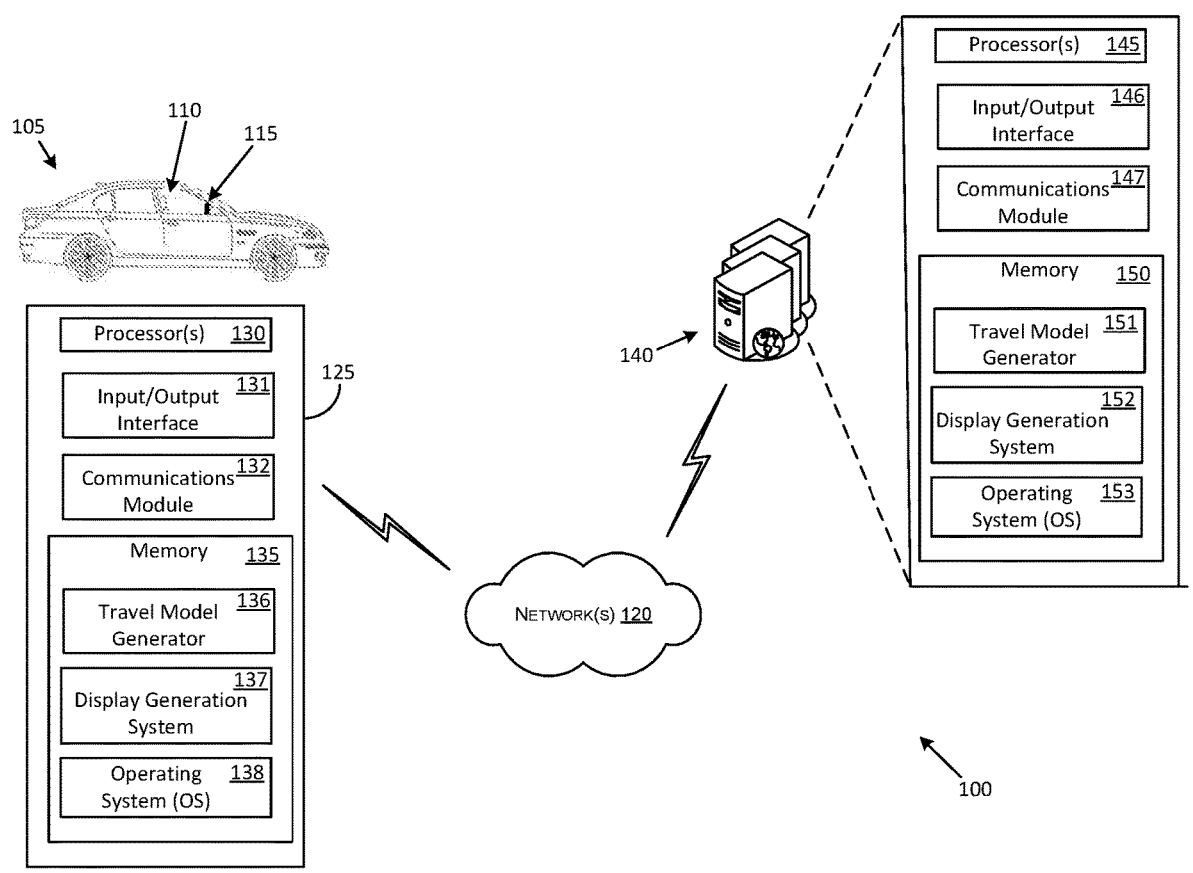
FIG. 1 illustrates an exemplary system that may be used for generating a customized display in a vehicle in accordance with the disclosure.

In terms of a general overview, various exemplary embodiments described in this disclosure are directed to systems and methods for generating a customized display in a vehicle. The customized display may be generated on the basis of various factors such as a reason for executing a trip, a preferred travel model, and/or operating parameters of the vehicle. A few exemplary reasons for executing a trip may include taking a vacation, delivering a package, dropping off a passenger, dining out, going to work, a fuel fill up, and/or for charging a battery. A travel model may be based on, for example, optimizing fuel consumption in a vehicle and/or travelling along a scenic route having some specific objects of interest to a driver. A computer may utilize one or more of the various factors such as a reason for executing a trip, a preferred travel model, and/or operating parameters of the vehicle in order to identify objects of interest in a geographical area surrounding the vehicle when the vehicle is executing the trip and generate a customized display that includes these objects. For example, when the reason for executing the trip is a vacation, the objects in the customized display may include a tourist attraction, a landmark, a fueling station, an electric charging station, a restaurant, and/or a travel hazard.

ILLUSTRATIVE EMBODIMENTS

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular component such as a first processor in a first computer may be performed by another component such as a second processor in another computer. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, words such as "vehicle," "automobile," and "truck" may be used interchangeably and should be understood in the context of the disclosure. Words such as "data" "signals," "indication," and "information" may be used interchangeably and should be understood in the context of the disclosure. Words such as "display," "images" and "imagery" may be used herein in an interchangeable manner and should be understood to refer to similar subject matter. Furthermore, the word "information" as used herein may refer to various items such as digital data, analog data, audio content, video content, and/or messages. These items may be operated upon by a computer containing a processor. Phrases such as "an object is displayed" or "based on a (factor)" as used herein should not be construed exclusively in a singular sense. These phrases should be understood to also encompass multiple objects that may be displayed and based on multiple factors. The phrase "autonomous vehicle" as used herein encompasses various other phrases such as "self-driving vehicle" and "robotic vehicle." It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

FIG. 1 illustrates an exemplary system 100 that may be used for generating a customized display in a vehicle 105 in accordance with the disclosure. The vehicle 105 may be one of various types of vehicles such as a vehicle having an internal combustion engine, a battery-operated vehicle (electric vehicle), or a hybrid vehicle having a battery system that works in cooperation with an internal combustion engine. A driver 110 may operate the vehicle 105 and use a display device 115 that is provided in the vehicle 105. The display device 115 may be configured to display imagery pertaining to a customized display that is generated by a computer in accordance with the disclosure. In some embodiments, the vehicle 105 can be an autonomous vehicle and the driver 110 may be a passive entity as far as driving the vehicle 105 is concerned, and/or may take control of the autonomous vehicle in case of an emergency. The driver 110 of the autonomous vehicle may use a display screen of the display device 115 to obtain information from the customized display that is generated by a computer in accordance with the disclosure and displayed on the display device 115.

In one exemplary implementation, the computer 125 may be a standalone computer provided in the vehicle 105 and located in a suitable place such as a trunk of the vehicle 105, a glove compartment of the vehicle 105, or under the hood of the vehicle 105. In another exemplary implementation, the computer 125 may be a part of an automobile computer that is provided in the vehicle 105 by a manufacturer of the vehicle 105. Some components of the automobile computer, such as a processor, may be configured to execute operations associated with operating the vehicle 105 as well as operations associated with generating a customized display in accordance with the disclosure.

In general, the computer 125 may include several components such as one or more processors and one or more memory devices. In the illustrative example shown in FIG. 1, the computer 125 includes a processor 130, an input/output interface 131, a communications module 132, and a memory 135. The memory 135, which is one example of a non-transitory computer-readable medium, may be used to store an operating system 138 and various code modules such as a travel model generator 136 and a display generation system 137.

The travel model generator 136 can be a code module that is executed by the processor 130 for generating one or more travel models in accordance with the disclosure. The travel models may be generated by incorporating various types of information such as input provided by the driver 110 and/or data received from a server system 140. In one exemplary implementation, the travel model generator 136 may be used to generate a travel model based on input provided by the driver 110 of the vehicle 105 and/or based on historical data associated with the driver 110. The historical data, which may provide an indication of personal preferences and habits of the driver 110, may be obtained over a period of time by the computer 125 by using various sensors. In some implementations, artificial intelligence techniques and algorithms may be applied upon the historical data as well as other data provided to the computer 125 (such as individual preferences and habits of the driver 110) for generating one or more travel models.

The display generation system 137 can be a code module that is executed by the processor 130 for generating a customized display in accordance with the disclosure. A few exemplary methods for generating a customized display are described below.

The communications module 132 can be used to allow the computer 125 to obtain information or to send information to various entities and systems that are communicatively coupled to the computer 125. For example, the communications module 132 may be used by the computer 125 to transmit information to and/or to receive information from the server system 140. In this exemplary embodiment, the information may be propagated through a network 120. The network 120 may include any one or a combination of various networks such as a data network, a telephone network, a cellular network, a cable network, a wireless network, a private network, a public network, a local area network (LAN), a wide area network (WAN), and the Internet. In some instances, the network 120 may support communication technologies such as Bluetooth, cellular, near-field communication (NFC), Wi-Fi, and/or Wi-Fi direct.

The input/output interface 131 may be configured to receive imagery information from the display generation system 137 and use the imagery information to provide drive signals to the display device 115 for displaying customized imagery in accordance with the disclosure. The input/output interface 131 may be further configured to receive signals from various sources such as sensors and transducers provided in the vehicle 105. For example, the input/output interface 131 may be configured to receive data from a fuel level sensor that provides information pertaining to a fuel level in a fuel tank of the vehicle 105. As another example, the input/output interface 131 may be configured to receive data from a battery charge level sensor that provides information pertaining to a level of electric charge present in one or more batteries of a battery system used in the vehicle 105 when for example, the vehicle 105 is an electric vehicle or a hybrid vehicle.

In general, the server system 140 can be a cloud-based system that includes one or more computers containing components such as processors and memory devices. In the illustrative example shown in FIG. 1, the server system 140 includes at least one computer having a processor 145, an input/output interface 146, a communications module 147, and a memory 150. The memory 150, which is another example of a non-transitory computer-readable medium, may be used to store an operating system 153 and various code modules such as a travel model generator 151 and a display generation system 152.

The input/output interface 146 may be configured to receive information from various sources such as the computer 125 installed in the vehicle 105, a computer installed in another vehicle, and/or computers that are a part of the cloud-based system. The information received via the input/output interface 146 may be provided to the processor 145 for processing.

In one exemplary implementation, the processor 145 may use the received information to generate one or more travel models by executing the travel model generator 151 that is a code module stored in the memory 150. The travel model generator 136 may be used to generate a travel model based on information provided by various computers located in various vehicles. The information provided by the various computers may be processed by the processor 145 to identify various parameters that may be applied in a universal manner. For example, some parameters may pertain to a set of performance characteristics of a certain type of vehicle (fuel consumption, repair history, reliability, etc.). Some other examples of travel models are described below.

The display generation system 152 can be a code module that is executed by the processor 145 using a cloud-based configuration to generate a customized display in accordance with the disclosure. In one exemplary implementation, the processor 145 may generate a customized display by using one or more travel models generated by the processor 145. The customized display that is generated by the display generation system 152 may be transmitted to the computer 125 via the network 120. The computer 125 can use the received customized display to provide drive signals to the display device 115 for displaying customized imagery in the vehicle 105 in accordance with the disclosure.

It must be understood that a memory device such as the memory 150 and the memory 135 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 2:
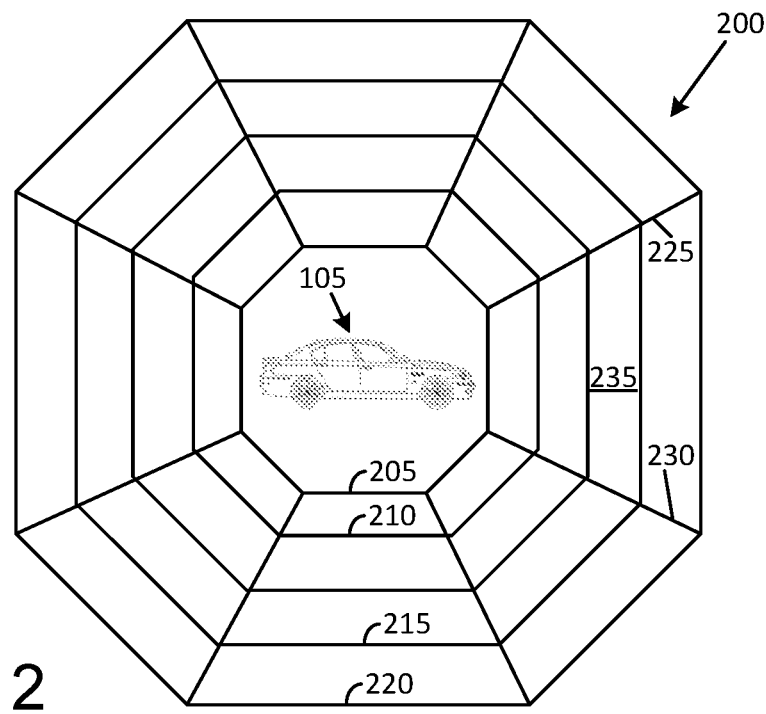
FIG. 2 illustrates a first exemplary customized display in accordance with the disclosure.

FIG. 2 illustrates an exemplary customized display 200 in accordance with the disclosure. The customized display 200 can be provided in the form of a human machine interface (HMI) that allows the driver 110 to interact with the customized display 200 for requesting and receiving various types of information that is of interest to the driver 110. In one implementation, the display device 115 may be a standalone device that is dedicated to displaying the customized display 200 and any other imagery that may be suitable for display along with the customized display 200. For example, the additional imagery may include a road map that is dynamically updated, as the vehicle 105 moves down a road. In another implementation, the display device 115 may be a modified version of a conventional navigation system that provides navigation assistance to the driver 110. The modified version may include the customized display 200 superimposed upon a map that is dynamically updated by the navigation system as the vehicle 105 moves down a road. Messages (visual and audible) that are typically provided in the conventional navigation system may be complemented or supplemented by messages that are generated in accordance with the disclosure.

The customized display 200 may be transferable from one platform to another. For example, the customized display 200 may be transferred between two or more devices such as between the display device 115, a cloud-based computer system, a remote computer, and a portable device (for example, a smartphone carried by the driver 110). The HMI provided in these devices may have an identical format in some cases and may be different in some other cases. For example, the customized display 200 may include certain details and have a large form factor when displayed on a screen of a computer, and may omit some details and have a smaller form factor when displayed on a smartphone. In some implementations, the customized display 200 may dynamically update itself over a period of time based on the use of features such as artificial intelligence, learning algorithms, and training procedures.

In the exemplary embodiment illustrated in FIG. 2, the customized display 200 is provided in the form of a spider web having radial spokes and a set of polygonal lines arranged in a concentric pattern. In this example, each polygonal line has an octagonal pattern and the vehicle 105 is displayed at the center of the spider web. Each polygonal line may provide an indication of a diametric distance from the vehicle 105. For example, a polygonal line 205 may indicate a diametric distance of 100 meters from the vehicle 105 and another polygonal line 210 may indicate a diametric distance of 200 meters from the vehicle 105. In this exemplary implementation, the concentric polygonal lines are located equidistant from each other. In other implementations, the concentric polygonal lines may be located at non-equidistant distances with respect to each other such as when arranged in a logarithmically increasing pattern.

Accordingly, when arranged in a logarithmic pattern, the distance between the polygonal line 205 and the polygonal line 210 may be 100 meters and the distance between the polygonal line 215 and the polygonal line 220 may be 500 meters for example. The radial spokes may be used to define angular segments of the customized display 200. For example, a pair of radial spokes (spoke 225 and spoke 230) may define a segment 235 located directly ahead of the vehicle 105.

Figure 3:
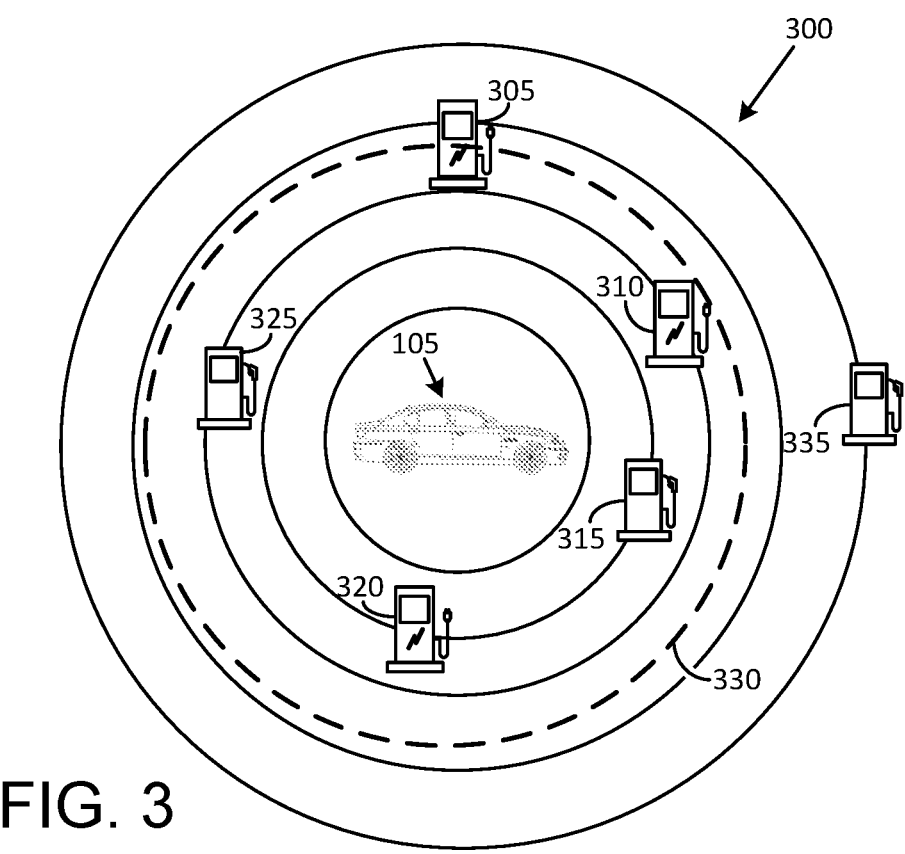
FIG. 3 illustrates a second exemplary customized display in accordance with the disclosure.

FIG. 3 illustrates an exemplary customized display 300 in accordance with the disclosure. In the exemplary embodiment, the customized display 300 is provided in the form of a set of concentric circles. The vehicle 105 is displayed at the center of the set of concentric circles. Each of the concentric circles may provide an indication of a diametric distance from the vehicle 105. In this exemplary implementation, the concentric circles are located equidistant from each other. In other implementations, the concentric circles may be located at non-equidistant distances with respect to each other such as when arranged in a logarithmically increasing pattern. In another exemplary implementation, the customized display 300 can be provided in a form that is based on one or more factors such as a preference of the driver 110, a type of the vehicle 105 (for example, sedan, truck, bus, van, electric vehicle, hybrid vehicle, or gasoline vehicle), and/or a type of image content to be displayed. In yet another exemplary implementation, the customized display 300 can be dynamic in nature and morph from one format to another format.

The customized display 300 provides one example of the nature and the type of objects in which the driver 110 may have expressed an interest and/or automatically determined by the computer 125 and/or the server system 140 to be of interest to the driver 110. For example, the driver 110 may have used the human machine interface of the display device 115 to request for certain types of information about one or more gas stations in the vicinity of the vehicle 105. For example, the driver 110 may have sought information about gas stations that provided certain amenities (snacks, deli, toilet, etc.) and/or that have the lowest prices for gasoline. In response to the request, the customized display 300 may display icons representing one or more gas stations (such as a gas station 325 and a gas station 315) having the amenities and/or the lowest prices for gasoline.

In one exemplary case, the computer 125 may obtain information from one or more sensors and determine that a fuel level in the vehicle 105 is below a threshold level. The threshold level may be set automatically set by the computer 125 or may be programmed into the computer 125 by the driver 110 or someone else such as for example, a manufacturer of the vehicle 105. In one exemplary case, upon determining that the fuel level in the vehicle 105 is below the threshold level, the computer may automatically generate the customized display 300 without any prompt or request initiated by the driver 110 in this matter. The customized display 300 may include icons representing one or more gas stations (such as the gas station 315 and the gas station 325) located inside a geographic area surrounding a current location of the vehicle 105.

In another exemplary case, upon determining that the fuel level in the vehicle 105 is below the threshold level, the computer may automatically render in the customized display 300, a message or a graphic that assists the driver 105 in making a decision to address the low fuel level. In an exemplary embodiment, the rendered graphic is a range-of-travel indicator 330. The range-of-travel indicator 330 provides an indication to the driver 110 as to how far the vehicle 105 can be driven without running out of fuel. The computer 125 may generate the range-of-travel indicator 330 based on various factors that may affect fuel consumption. Some exemplary factors include: characteristics of the road ahead, traffic conditions ahead of the vehicle 105, and environmental conditions around and ahead of the vehicle 105. Characteristics of the road ahead may include, for example, a slope of the road (uphill, downhill, flat, hilly, winding, etc.), various speed limits, and type of road surface (paved, unpaved, gravel etc.). Such road characteristics may influence how far, and at what speed, the vehicle 105 can travel and the resulting fuel consumption rate. Traffic conditions ahead of the vehicle 105 may influence how far, and at what speed, the vehicle 105 can travel, and the resulting fuel consumption rate. Environmental conditions around and ahead of the vehicle 105 may influence speed and fuel consumption rate. For example, foggy, icy, or rainy conditions may reduce speed of travel and increase fuel consumption, while clear, sunny conditions may allow for adjustments in the speed of travel for optimizing fuel consumption.

The range-of-travel indicator 330, which may be provided as an overlay on a map and the various icons representing one or more gas stations, not only alerts the driver 110 of a low fuel condition in the vehicle 105 but also allows the driver 110 to obtain information about the availability of gas stations for refueling the vehicle 105. For example, the driver 110 may use the range-of-travel indicator 330 shown in FIG. 5, to identify a gas station 315 that would be suitable for refueling. On the other hand, the driver 110 can recognize that the vehicle 105 would run out of fuel before reaching a gas station 335. The driver 110 can also determine that the vehicle 105 may be turned around to travel to the gas station 325 for refueling if so desired.

In another exemplary implementation, the computer 125 may obtain information from one or more sensors and determine that a charge level in a battery system of the vehicle 105 (when the vehicle 105 is an electric vehicle) is below a threshold level. The threshold level may be set automatically set by the computer 125 or may be programmed into the computer 125 by the driver 110 or someone else such as for example, a manufacturer of the vehicle 105. Upon determining that the charge level in the battery system is below the threshold level, the computer may automatically generate the customized display 300 with icons representing one or more charging stations (such as the charging station 305, the charging station 310, and the charging station 320) located inside a geographic area surrounding a current location of the vehicle 105. In at least some cases, the computer 125 may generate the customized display 300 and display the customized display 300 on the display device 115 without any action being taken by the driver 110 of the vehicle 105 in this matter.

In an exemplary case, upon determining that the charge level is below the threshold level, the computer may automatically render in the customized display 300, a message or a graphic that assists the driver 105 in making a decision to address the low charge level. In one exemplary embodiment, the rendered graphic is a range-of-travel indicator 330. The range-of-travel indicator 330 provides an indication to the driver 110 as to how far the vehicle 105 can be driven on the remaining charge. The computer 125 may generate the range-of-travel indicator 330 based on various factors that may affect charge depletion. Some exemplary factors include: characteristics of the road ahead, traffic conditions around and ahead of the vehicle 105, and environmental conditions around and ahead of the vehicle 105. Characteristics of the road ahead may include for example, a slope of the road (uphill, downhill, flat, hilly, winding, etc.), various speed limits, and type of road surface (paved, unpaved, gravel etc.). Such characteristics may influence how far, and at what speed, the vehicle 105 can travel on the existing charge and an expected rate of charge consumption. Traffic conditions around and ahead of the vehicle 105 may influence how far, and at what speed, the vehicle 105 can travel on the existing charge and an expected rate of charge consumption. Environmental conditions around and ahead of the vehicle 105 may influence speed and charge depletion. For example, foggy, icy, or rainy conditions may reduce speed of travel and increase charge depletion, while clear, sunny conditions may allow for adjustments in the speed of travel and optimize use of the remaining charge in the battery system.

The range-of-travel indicator 330, which is described above and may be similarly provided as an overlay on the map and the various icons representing one or more charging stations, not only alerts the driver 110 of the low charge condition, but also allows the driver 110 to obtain information about the availability of charging stations for charging the battery system in the vehicle 105. The driver 110 may use the exemplary range-of-travel indicator 330 shown in FIG. 5, to identify a charging station 310 that would be suitable for recharging and one or more other charging stations that may be beyond reach due to the low charge condition in the battery system. The driver 110 can also determine that the vehicle 105 may be turned in various other directions to travel to other charging stations if so desired.

In yet another exemplary implementation, the computer 125 may automatically generate the customized display 300 with icons representing one or more restaurants located inside a geographic area surrounding a current location of the vehicle 105. The displaying of the icons may be based on one or more of various factors such as, for example, personal preferences of the driver 110 (such as a preference for Chinese food, Mexican food, or fast food; a preference for restaurants having drive-through facilities; and/or a preference for restaurants having toilet facilities), a time of day (for example, around lunch time when the driver 110 typically stops for lunch), and an availability (or lack of availability) of eateries along a travel route. In at least some cases, the computer 125 may generate the customized display 300 (with icons representing one or more restaurants) and display the customized display 300 on the display device 115 without any action being taken by the driver 110 of the vehicle 105 in this matter.

Figure 4:
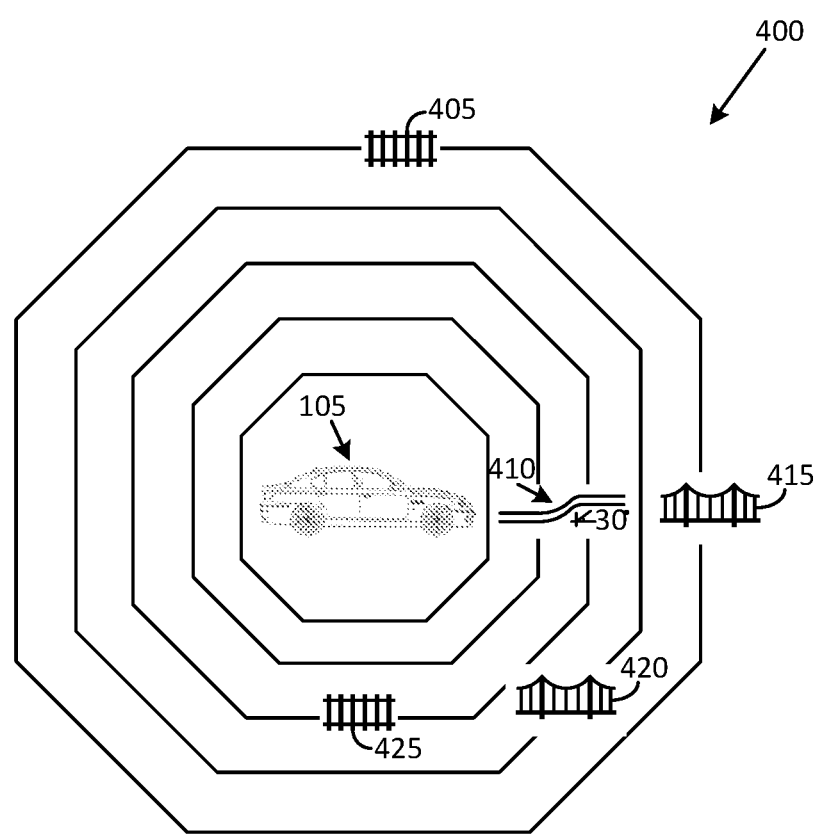
FIG. 4 illustrates a third exemplary customized display in accordance with the disclosure.

FIG. 4 illustrates an exemplary customized display 400 in accordance with the disclosure. In this exemplary embodiment, the customized display 400 is provided in the form of a spider web having a set of polygonal lines arranged in a concentric pattern and includes a number of icons representing various geographic and/or topological features that may be helpful to the driver 110. A first icon 410 provides information pertaining to a topography of the road ahead of the vehicle 105, such as an angle of inclination of an upcoming slope. Each of an icon 415 and an icon 420 provides an indication of a bridge. Each of an icon 405 and an icon 425 provides an indication of a railway crossing. Some of these icons may provide driving-related information to the driver 110 and some other icons (not shown) may indicate places and/or objects of interest that the driver 110 may be interested while using the vehicle 105 to travel on a vacation for example.

Figure 5:
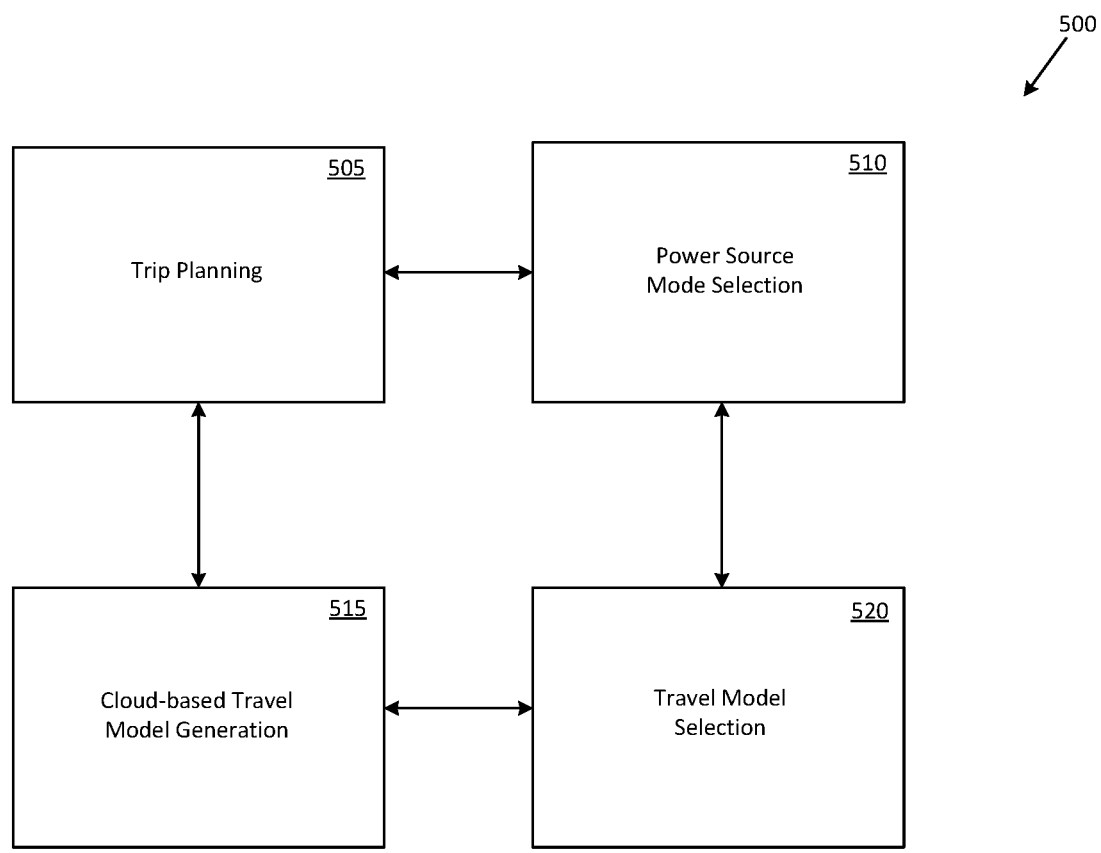
FIG. 5 illustrates a first exemplary cloud-based system for generating a customized display in a vehicle in accordance with the disclosure.

FIG. 5 illustrates an exemplary cloud-based system 500 for generating a customized display in a vehicle in accordance with the disclosure. The cloud-based system 500 may include several functional blocks interlinked with each other (as indicated by the bi-directional arrows). The exemplary functional blocks, which can be executed by one or more computers, include a block related to trip planning 505, a block related to cloud-based travel model generation 515, a block related to travel model selection 520, and a block related to power source mode selection 510.

The block related to trip planning 505 pertains in general to various factors associated with a trip. The various factors can include for example, a reason for executing the trip, a type of vehicle to be used for the trip, and whether the trip includes one or more segments. In one example case, a reason for executing the trip may involve transporting one or more passengers to various destinations in a car. In another example case, a reason for executing the trip may involve dropping off packages at multiple locations using a delivery truck. In another example case, a reason for executing the trip may be providing a carpool service where various people are picked up in a van at various pickup locations.

The block related to cloud-based travel model generation 515 generally pertains to various travel models that may be generated by one or more computers such as the computer 125 or the server system 140, using information provided by several vehicle drivers (may or not include the driver 110 of the vehicle 105). The various travel models can be based on various types of information such as performance characteristics of one or more types of vehicle, places and objects of interest along certain travel routes, personal experiences of drivers with people and places along a travel route, and/or information related to goods delivery (such as tariffs, rules, and laws that may be applied to goods transported over a travel route).

The block related to travel model selection 520 generally pertains to certain algorithms that may be executed by one or more computers such as the computer 125 or the server system 140, and applied to the travel models generated by the cloud-based travel model generation 515. The algorithms may be used to aggregate several travel models so as to determine an optimum model that can be used by a driver such as the driver 110 of the vehicle 105.

The block related to power source mode selection 510 generally pertains to the selection of a power source when the vehicle 105 is a hybrid vehicle. In one example case, the power source mode selection 510 may use a travel model to configure the computer 125 in the vehicle 105 to enable the operation of an internal combustion engine of the hybrid vehicle during a certain portion of a trip so as to ensure that the battery system has a desired charge level upon reaching a destination. The battery system may then be used at the destination for various purposes such as, for example, to power a lighting component at a campsite or to operate a winch for lifting a load.

Figure 6:
FIG. 6 shows a first tabular representation indicating exemplary parameters that may be used for generating a customized display in a vehicle in accordance with the disclosure.

FIG. 6 shows a first tabular representation indicating exemplary parameters that may be used when executing the block pertaining to trip planning 505 shown in FIG. 5. The first tabular representation pertains to a situation where the vehicle 105 is configured for delivering goods on a trip. In this example, the trip involves a single segment wherein the vehicle 105 starts from a terminal location 605 and includes a pickup location 610 where one or more objects are picked up before proceeding to a drop-off location 611. The trip may involve a trip time 615 and may also involve traversing a terrain having a certain geography such as for example a hilly terrain that requires extensive use of a battery system in an electric vehicle or a relative flat terrain that requires less use of the battery system. Parameters such as charging station information 640 and current charge level 660 may be used for planning the trip. The parameters may be determined on the basis of factors such as the geography 620 and traffic density 625.

When the vehicle utilizes a conventional internal combustion engine, parameters such as heating/cooling requirements 630, gas station information 635, and current fuel level 645 may be factored in for planning the trip. Other parameters that may be taken into consideration when planning the trip include heating/cooling requirements 630, type of goods 655 that are to be transported, weather information 650 (cold, snowy, rainy, icy etc.), and/or one or more types of travel models. These travel models, which may be generated by a cloud-based travel model generation 515 (shown in FIG. 5) can include, for example, a fuel optimization travel model 665, a charge optimization travel model 670, and a pre-conditioning optimization model 675.

FIG. 7 shows a second tabular representation indicating exemplary parameters that may be used when executing the block pertaining to trip planning 505 shown in FIG. 5. The second tabular representation pertains to a situation where the vehicle 105 is configured for delivering goods on a trip that includes multiple segments. In this example, the vehicle 105 starts from a terminal location 605 and includes multiple pickup locations 710 and multiple drop-off locations 711. The trip time 715 may be defined as a cumulative amount of time that is taken to complete the multiple trips. Various other parameters that may be included in such a trip involving the multiple segments can be similar to, or modified versions of, the ones described above with respect to the single segment trip and indicated by identical reference numeral designators.

FIG. 8 shows a third tabular representation indicating exemplary parameters that may be used when executing the block pertaining to trip planning 505 shown in FIG. 5. The third tabular representation pertains to a situation where the vehicle 105 is configured for transporting people on a trip. In this example, the trip involves a single segment wherein the vehicle 105 starts from a terminal location 605 and includes a pickup location 610 where one or more passengers may be picked up before proceeding to a drop-off location 611. Parameters such as vehicle occupancy information 805 and driving habits 810 of the driver 110 may be included as parameters to be taken into consideration for such a trip. The vehicle occupancy information 805 and/or driving habits 810 may help in selecting one of the various travel models during trip planning and may also provide an indication about certain aspects of the trip such as a gas consumption of the vehicle 105. Various other parameters that may be included in such a trip involving the transportation of people can be similar to, or modified versions of, the ones described above with respect to the single segment trip involving goods transport and/or the single segment trip involving people transport. These parameters are indicated by identical reference numeral designators in the various figures.

FIG. 9 shows a fourth tabular representation indicating exemplary parameters that may be used when executing the block pertaining to trip planning 505 shown in FIG. 5. The fourth tabular representation pertains to a situation where the vehicle 105 is configured for transporting a number of people on a trip that involves multiple segments. The vehicle 105 may pick up one or more passengers from each of various pickup locations such as the pickup location 905 and/or wave locations 915. The wave locations 915 can correspond to locations where a person may wave down the vehicle 105 to obtain a ride (such as when the vehicle 105 provides on-demand ride service). The trip times 920 can vary based on various parameters such as the number of people, the pickup locations 905, and/or the drop off locations 910. The various parameters that may be included in such a trip involving the transportation of a number of people can be similar to, or modified versions of, the various exemplary embodiments described above. These parameters are indicated by identical reference numeral designators.

FIG. 10 shows a fifth tabular representation indicating exemplary parameters that may be used when executing the block pertaining to trip planning 505 shown in FIG. 5. The fifth tabular representation pertains to a situation where the vehicle 105 is configured for transporting a number of people and/or goods on a trip that involves multiple segments. The vehicle 105 may pick up each person and/or goods from a terminal location 605 and/or a pickup location 610. The trip planning can include various factors such as range information 11 (when the vehicle 105 is an electric vehicle), direction of travel 12 (may provide information pertaining to facilities and restaurants along the route), boundary information 13, and a historic geofence 14. In some cases, the pickup location 610 and drop-off location 611 may not be known ahead of time. If so, a trip may be planned using the range information 11 (shortest range of travel, for example), the farthest estimated distance, and/or a historic geofence 14 based on a driver's previous driving habits. The boundary information 13 may pertain to rules and laws that are applicable to certain types of vehicles such as hybrid-electric vehicles for preventing usage of internal combustion engines in certain areas. Various other parameters that may be included in such a trip can be similar to, or modified versions of, the various exemplary embodiments described above. These parameters are indicated by identical reference numeral designators.

FIG. 11 shows a sixth tabular representation indicating exemplary parameters that may be used when executing the block pertaining to trip planning 505 shown in FIG. 5. The sixth tabular representation pertains to a situation where the vehicle 105 is configured for transporting a number of people and/or goods on a trip that involves multiple segments. The vehicle 105 may pick up each person and/or goods from a terminal location 605 and/or a pickup location 610. The trip planning can include various factors such as range information 11 (when the vehicle 105 is an electric vehicle), direction of travel 12 (may provide information pertaining to facilities and restaurants along the route), boundary information 13, and historic geofence 14. The boundary information 13 and a historic geofence 14 may pertain to rules and laws that are applicable to certain types of vehicles such as hybrid-electric vehicles for preventing usage of internal combustion engines in certain areas. Various other parameters that may be included in such a trip can be similar to, or modified versions of, the various exemplary embodiments described above. These parameters are indicated by identical reference numeral designators.

Figure 12:
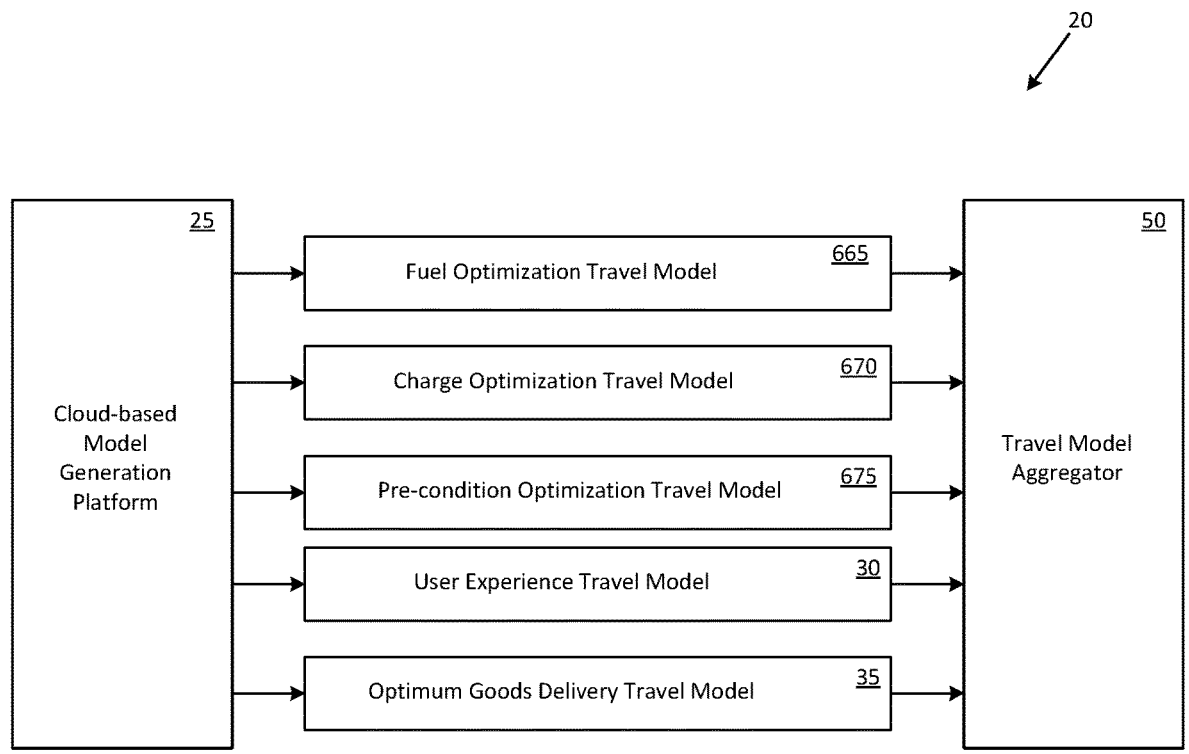
FIG. 12 illustrates a second exemplary cloud-based system for generating a customized display in a vehicle in accordance with the disclosure.

FIG. 12 illustrates an exemplary cloud-based system 20 for generating a customized display in a vehicle such as the vehicle 105, in accordance with the disclosure. The various functional blocks of the cloud-based system 20, which can be parts of the cloud-based travel model generation 515 shown in FIG. 5, may be implemented in the form of software that is executed by a computer such as the computer 125 or the server system 140. In the context of software, the operations described herein with respect to computers such as the computer 125 and/or the server system 140 may be implemented by computer-executable instructions stored on one or more non-transitory computer-readable media such as the memory 135 or the memory 150, that, when executed by one or more processors such as the processor 130 or the processor 145, perform the recited operations. Generally, computer-executable instructions include routines, programs, objects, components, data structures, and the like that perform particular functions or implement particular abstract data types.

The cloud-based model generation platform 25 may involve the use of one or more computer algorithms for generating various types of travel models. A few examples of travel models may include a fuel optimization travel model 665, a charge optimization travel model 670, a pre-conditioning optimization model 675, a user experience travel model 30, and an optimum goods delivery travel model 35. Some or all of the travel models may be generated by using artificial intelligence techniques upon various types of data including historical data.

The fuel optimization travel model 665 can include information pertaining to various ways by which the vehicle 105 can be configured, and/or used to provide optimum mileage during an upcoming trip. For example, the fuel optimization travel model 665 can include information pertaining to the use of heating and/or cooling apparatuses in the vehicle 105 during the trip, and/or a type of gasoline that may be used for making the trip.

The charge optimization travel model 670 can include information pertaining to usage of an internal combustion engine so as to conserve battery power when the vehicle used for the trip is a hybrid vehicle. For example, the charge optimization travel model 670 can include information pertaining to pre-starting the internal combustion engine prior to the planned upcoming trip so as to warm up an interior portion of the hybrid vehicle using the internal combustion engine rather than the battery system.

The pre-condition optimization travel model 675 may provide information regarding various actions that can be taken to pre-condition the vehicle 105 before starting the trip. For example, when the vehicle 105 is an electric vehicle, various actions can be taken to reduce an amount of loading of a battery system in the vehicle 105 during the trip. Some exemplary actions for reducing the amount of loading on the battery system may include optimizing defrosting/de-icing operations, regulating heating/cooling operations, executing certain types of data collecting and/or processing operations while the vehicle 105 is stationary, and pre-charging the battery system to a desired level.

The user experience travel model 30 may provide information that is based on historical data associated with various trips made by various drivers. For example, a first driver may provide information about his/her experience during one or more trips over a certain route. A second driver may provide information about his/her experience during one or more trips over the same route. The experiences of the second driver may be different than those of the first driver.

The optimum goods delivery travel model 35 may provide information that is based on historical data associated with various trips made by various delivery drivers using various types of delivery vehicles. For example, a first driver may provide information about his/her experience driving over a certain delivery route using a certain type of vehicle (a hybrid vehicle, for example). A second driver may provide information about his/her experience driving over the same delivery route using a different type of vehicle (an electric vehicle, for example) during one or more trips over the same route. The experiences of the second driver may be different than those of the first driver and the information provided by the second driver with reference to the vehicle used may be different as well.

The travel model aggregator 50 may process one or more of the various travel models by using one or more algorithms to aggregate and generate a cloud-based travel model that can be used by various drivers. The travel model selection 520 block shown in FIG. 5, may select the cloud-based travel model generated by the travel model aggregator 50 and use the cloud-based travel model for executing a power source mode selection 510 that is also shown in FIG. 5. The power source mode selection 510 may be specifically pertinent when the vehicle 105 is a hybrid vehicle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein.

An implementation of the devices, systems, and methods disclosed herein may communicate over a computer network. A "network" and a "bus" is defined as one or more data links that enable the transport of electronic data between computer systems and/or modules and/or other electronic devices. When information is transferred or provided over a network, a bus, or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more Application Specific Integrated Circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments. Although certain aspects of various embodiments may have been described using a singular word or phrase (such as "a signal" or "a processor") it should be understood that the description may be equally applicable to plural words or phrases (such as "signals" and "processors").

That which is claimed is:

1. A method comprising:
receiving, by a first computer, input information comprising at least one reason for executing a trip by a vehicle;
adjusting one or more operations associated with the vehicle while the vehicle is stationary before the trip starts based on the at least one reason for executing the trip by the vehicle and a type of the vehicle, wherein the one or more operations comprise at least one of pre-starting an engine to warm up an interior option of the vehicle, or pre-conditioning the vehicle to reduce an amount of loading on a battery system in the vehicle;
identifying, by the first computer and based on the input information, one or more objects located in a geographical area surrounding the vehicle when the vehicle is executing the trip, the one or more objects associated with the at least one reason for executing the trip; and
generating, by the first computer, a customized display comprising the one or more objects.

2. The method of claim 1, wherein the at least one reason for executing the trip comprises at least one of taking a vacation, making one or more deliveries, to eat, on work, to drop off and/or pick up one or more passengers, to recharge the battery system in the vehicle, or for sight-seeing, and wherein the one or more objects located in the geographical area surrounding the vehicle comprises at least one of a tourist attraction, a landmark, an electric charging station, a restaurant, a road, or a travel hazard.

3. The method of claim 1, wherein the customized display comprises the one or more objects overlaid on a navigation system that includes a road map and navigation assistance, and wherein the customized display is provided in a form of a spider web arranged in a concentric pattern relative to a location of the vehicle.

4. The method of claim 1, wherein the input information further comprises a first travel model and a second travel model, the first travel model configured to adjust a first operation of the one or more operations and the second travel model configured to adjust a second operation of the one or more operations, wherein the first travel model and the second travel model are aggregated to adjust the first operation and the second operation before the trip starts based on the at least one reason for executing the trip by the vehicle.

5. The method of claim 4, wherein utilizing the input information, by the first computer, to identify the one or more objects located in the geographical area surrounding the vehicle when the vehicle is executing the trip comprises utilizing one of the first travel model or the second travel model.

6. The method of claim 1, wherein the type of the vehicle comprises one of a battery-operated vehicle, a hybrid vehicle, or a vehicle that is operated exclusively on an internal combustion engine.

7. The method of claim 1, further comprising:
displaying, on a display screen of a display device in the vehicle, the customized display comprising the one or more objects; and
dynamically updating the customized display as the vehicle is executing the trip, wherein dynamically updating the customized display as the vehicle is executing the trip comprises:
automatically displaying a first object of the one or more objects in the customized display based on a first user preference associated with a first time period prior to receiving a first user input; and
automatically displaying a second object of the one or more objects in the customized display based on a second user preference associated with a second time period prior to receiving a second user input.

8. A method comprising:
generating, by at least one of a first computer or a second computer, a first travel model configured to adjust a first operation associated with a vehicle;
generating, by at least one of the first computer or the second computer, a second travel model configured to adjust a second operation associated with the vehicle;
adjusting the first operation and the second operation associated with the vehicle while the vehicle is stationary before a trip starts based on at least one reason for executing the trip by the vehicle and a type of the vehicle, wherein the first operation comprises at least one of pre-starting an engine to warm up an interior option of the vehicle, or pre-conditioning the vehicle to reduce an amount of loading on a battery system in the vehicle;
and
generating, by the at least one of the first computer or the second computer, a customized display based on selecting at least the first travel model or the second travel model, the customized display comprising one or more objects located in a geographical area surrounding the vehicle when the vehicle is executing the trip.

9. The method of claim 8, wherein the at least one reason for executing the trip comprises at least one of taking a vacation, making one or more deliveries, to eat, on work, to drop off and/or pick up one or more passengers, to recharge the battery system in the vehicle, or for sight-seeing, and wherein the one or more objects located in the geographical area surrounding the vehicle comprises at least one of a tourist attraction, a landmark, an electric charging station, a restaurant, a road, or a travel hazard.

10. The method of claim 9, wherein the first computer is located inside the vehicle and the second computer is located outside the vehicle, the second computer communicatively coupled to the first computer via a wireless link.

11. The method of claim 8, wherein the customized display comprises the one or more objects overlaid on a navigation system that includes a road map and navigation assistance, and wherein the customized display is provided in a form of a spider web arranged in a concentric pattern relative to a location of the vehicle.

12. The method of claim 8, wherein the type of the vehicle comprises one of a battery-operated vehicle, a hybrid vehicle, or a vehicle that is operated exclusively on an internal combustion engine.

13. The method of claim 8, further comprising:
displaying, on a display screen of a display device in the vehicle, the customized display comprising the one or more objects; and
dynamically updating the customized display as the vehicle is executing the trip, wherein dynamically updating the customized display as the vehicle is executing the trip comprises:
automatically displaying a first object of the one or more objects in the customized display based on a first user preference associated with a first time period prior to receiving a first user input; and
automatically displaying a second object of the one or more objects in the customized display based on a second user preference associated with a second time period prior to receiving a second user input.

14. A system comprising:
at least one memory that stores computer-executable instructions; and
at least one computer configured to access the at least one memory and execute the computer-executable instructions to at least:
receive input information comprising at least one reason for executing a trip by a vehicle;
adjust one or more operations associated with the vehicle while the vehicle is stationary before the trip starts based on the at least one reason for executing the trip by the vehicle and a type of the vehicle, wherein the one or more operations comprise at least one of pre-starting an engine to warm up an interior option of the vehicle, or pre-conditioning the vehicle to reduce an amount of loading on a battery system in the vehicle;
utilize the input information to identify one or more objects located in a geographical area surrounding the vehicle when the vehicle is executing the trip, the one or more objects associated with the at least one reason for executing the trip; and
generate a customized display comprising the one or more objects.

15. The system of claim 14, wherein the at least one reason for executing the trip comprises at least one of taking a vacation, making one or more deliveries, to eat, on work, to drop off and/or pick up one or more passengers, to recharge the battery system in the vehicle, or for sight-seeing, and wherein the one or more objects located in the geographical area surrounding the vehicle comprises at least one of a tourist attraction, a landmark, an electric charging station, a restaurant, a road, or a travel hazard.

16. The system of claim 14, wherein the customized display comprises the one or more objects overlaid on a navigation system that includes a road map and navigation assistance, and wherein the customized display is provided in a form of a spider web arranged in a concentric pattern relative to a location of the vehicle.

17. The system of claim 14, wherein the input information further comprises a first travel model and a second travel model, the first travel model configured to adjust a first operation of the one or more operations and the second travel model configured to adjust a second operation of the one or more operations, wherein the first travel model and the second travel model are aggregated to adjust the first operation and the second operation before the trip starts based on the at least one reason for executing the trip by the vehicle.

18. The system of claim 17, wherein utilizing the input information, by the at least one computer, to identify the one or more objects located in the geographical area surrounding the vehicle when the vehicle is executing the trip comprises utilizing one of the first travel model or the second travel model.

19. The system of claim 14, wherein the type of the vehicle comprises one of a battery-operated vehicle, a hybrid vehicle, or a vehicle that is operated exclusively on an internal combustion engine.

20. The system of claim 14, wherein executing the computer-executable instructions further comprises:
- displaying on a display screen of a display device, the customized display comprising the one or more objects; and
- dynamically updating the customized display as the vehicle is executing the trip, wherein dynamically updating the customized display as the vehicle is executing the trip comprises:
  - automatically displaying a first object of the one or more objects in the customized display based on a first user preference associated with a first time period prior to receiving a first user input; and
  - automatically displaying a second object of the one or more objects in the customized display based on a second user preference associated with a second time period prior to receiving a second user input.

* * * * *